US008949258B2

United States Patent
Pryor-Miller et al.

(10) Patent No.: US 8,949,258 B2
(45) Date of Patent: Feb. 3, 2015

(54) TECHNIQUES TO MANAGE FILE CONVERSIONS

(75) Inventors: Andrew Pryor-Miller, Redmond, WA (US); James Leung, Redmond, WA (US); Ali Taleghani, Seattle, WA (US); Zeyad Rajabi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 433 days.

(21) Appl. No.: 13/236,901

(22) Filed: Sep. 20, 2011

(65) Prior Publication Data

US 2012/0254204 A1 Oct. 4, 2012

Related U.S. Application Data

(60) Provisional application No. 61/468,469, filed on Mar. 28, 2011.

(51) Int. Cl.
*G06F 17/30* (2006.01)
*G06F 17/28* (2006.01)
*G06F 17/22* (2006.01)

(52) U.S. Cl.
CPC .......... *G06F 17/289* (2013.01); *G06F 17/2264* (2013.01)
USPC .................................. 707/756; 707/E17.006

(58) Field of Classification Search
USPC .......................................... 707/756, E17.006
See application file for complete search history.

(56) References Cited

U.S. PATENT DOCUMENTS

| | | | |
|---|---|---|---|
| 6,023,706 A | 2/2000 | Schmuck et al. | |
| 6,122,290 A | 9/2000 | Kawamata | |
| 6,433,716 B2 * | 8/2002 | Arai et al. | 341/141 |
| 6,587,735 B1 * | 7/2003 | Yaguchi | 700/2 |
| 6,674,558 B1 | 1/2004 | Chang et al. | |
| 6,714,979 B1 * | 3/2004 | Brandt et al. | 709/225 |
| 2002/0078130 A1 * | 6/2002 | Thornton et al. | 709/201 |
| 2006/0041840 A1 * | 2/2006 | Blair et al. | 715/513 |
| 2008/0039010 A1 | 2/2008 | Vance et al. | |
| 2008/0068657 A1 | 3/2008 | Uchida et al. | |
| 2008/0098395 A1 * | 4/2008 | Backer | 718/102 |
| 2011/0010581 A1 | 1/2011 | Tanttu et al. | |

(Continued)

OTHER PUBLICATIONS

"Building Windows Azure Applications with the Caching Service", Retrieved at <<http://msdn.microsoft.com/en-us/WAZPlatformTrainingCourse_BuildingAppsWithCacheService>>, Retrieved Date: Mar. 18, 2011, pp. 2.

(Continued)

*Primary Examiner* — Leslie Wong
(74) *Attorney, Agent, or Firm* — Jessica Meyers; David Andrews; Micky Minhas

(57) ABSTRACT

Techniques to manage file conversions are described. File conversion requests to convert files between different file formats are received. A determination is made whether the file conversion requests are synchronous file conversion requests or asynchronous file conversion requests. The synchronous file conversion requests are stored in a synchronous job queue. The asynchronous file conversion requests are stored in an asynchronous job queue. Files are converted between the different file formats that are associated with synchronous file conversion requests stored in the synchronous job queue prior to asynchronous file conversion requests stored in the asynchronous job queue. Other embodiments are described and claimed.

20 Claims, 7 Drawing Sheets

(56) References Cited

U.S. PATENT DOCUMENTS

| | | | |
|---|---|---|---|
| 2012/0008164 A1* | 1/2012 | Nanaumi .................. | 358/1.15 |
| 2013/0061220 A1* | 3/2013 | Gnanasambandam et al. ... | 718/1 |

OTHER PUBLICATIONS

"Overview (StreamInsight)", Retrieved at <<http://msdn.microsoft.com/en-us/library/ee391416(SQL.105).aspx>>, Retrieved Date: Mar. 18, 2011, pp. 4.

"Plan for Document Conversion in Office 2010", Retrieved at <<http://technet.microsoft.com/en-us/library/gg298948.aspx>>, Retrieved Date: Sep. 30, 2010, pp. 9.

"Let Users View MS Office® Documents in your Online Application", Retrieved at <<http://product.thinkfree.com/server/conversion>>, Retrieved Date: Mar. 18, 2011, pp. 2.

Savill, John, "What's Windows Azure", Retrieved at <<http://www.windowsitpro.com/article/windows-azure-platform2/Q-What-s-Windows-Azure-.aspx>>, Retrieved Date: Mar. 18, 2011, pp. 4.

"RIA for IBM i for Power Systems including AS/400, iSeries, and System i", Retrieved at <<http://unipaas.blogspot.com/2010/10/ria-for-ibm-i-for-power-systems.html>>, Retrieved Date: Oct. 22, 2010, pp. 6.

"International Search Report", Mailed Date: Sep. 25, 2012, Application No. PCT/US2012/027045, Filed Date: Feb. 28, 2012, pp. 12.

"Plan for Document Conversion in Office 2010", Retrieved at <<http://technet.microsoft.com/en-us/library/gg298948.aspx>>, Retrieved Date: Mar. 18, 2011, pp. 9.

Savill, John, "What's Windows Azure", Retrieved at <<http://www.windowsitpro.com/article/windows-azure-platform2/Q-What-s-Windows-Azure-.aspx>>, Mar. 30, 2010, pp. 4.

"RIA for IBM i for Power Systems including AS/400, iSeries, and System i", Retrieved at <<http://unipaas.blogspot.com/2010/10/ria-for-ibm-i-for-power-systems.html>>, Oct. 22, 2010, pp. 6.

* cited by examiner

400

```
RECEIVE FILE CONVERSION REQUESTS TO CONVERT FILES
BETWEEN DIFFERENT FILE FORMATS
402
```

```
DETERMINE WHETHER THE FILE CONVERSION REQUESTS
ARE SYNCHRONOUS FILE CONVERSION REQUESTS OR
ASYNCHRONOUS FILE CONVERSION REQUESTS
404
```

```
STORE SYNCHRONOUS FILE CONVERSION REQUESTS IN A
SYNCHRONOUS JOB QUEUE
406
```

```
STORE ASYNCHRONOUS FILE CONVERSION REQUESTS IN AN
ASYNCHRONOUS JOB QUEUE
408
```

```
PROCESS THE SYNCHRONOUS FILE CONVERSION REQUESTS
STORED IN THE SYNCHRONOUS JOB QUEUE BEFORE THE
ASYNCHRONOUS FILE CONVERSION REQUESTS STORED IN
THE ASYNCHRONOUS JOB QUEUE
410
```

*FIG. 4*

ТЕCHNIQUES TO MANAGE FILE CONVERSIONS

RELATED APPLICATION

This application claims priority to U.S. Provisional Patent Application Ser. No. 61/468,469 entitled "Techniques To Manage File Conversions" filed on Mar. 28, 2011, which is incorporated herein by reference in its entirety.

BACKGROUND

A file conversion system may convert computer files between file formats. When converting files from one file format to another there are two main scenarios that users are interested in: (1) high throughput conversion operations that can convert many files at a time in an asynchronous manner; and (2) low latency conversion operations that can convert one file immediately in a synchronous manner. A high throughput conversion operation is designed for scenarios that require the conversion of many files, where the user does not need the conversions to occur immediately. A low latency conversion operation is suited for scenarios where one file needs to be converted, where the user requires some kind immediacy to the conversion operation. Having a system that can accommodate both scenarios requires special consideration for resource allocation across the two types of conversion requests. In addition to handling different conversion scenarios, the file conversion system needs to account for resource allocation across multiple tenants within the same server resources. In other words, if company A and company B are both using the same server resources, the file conversion system needs to accommodate requests from both companies in a manner that does not result in one company monopolizing all of the resources. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Embodiments are generally directed to file conversion systems. Some embodiments are particularly directed to a file conversion system arranged to perform both high throughput and low latency file conversions from one file format into another file format using a same set of server resources. In addition, the file conversion service is able to accommodate multiple file conversion requests, including both high throughput and low latency requests, from multiple clients using the same set of server resources. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 4 illustrates an embodiment of a logic flow for file conversions.

DETAILED DESCRIPTION

Figure 1:
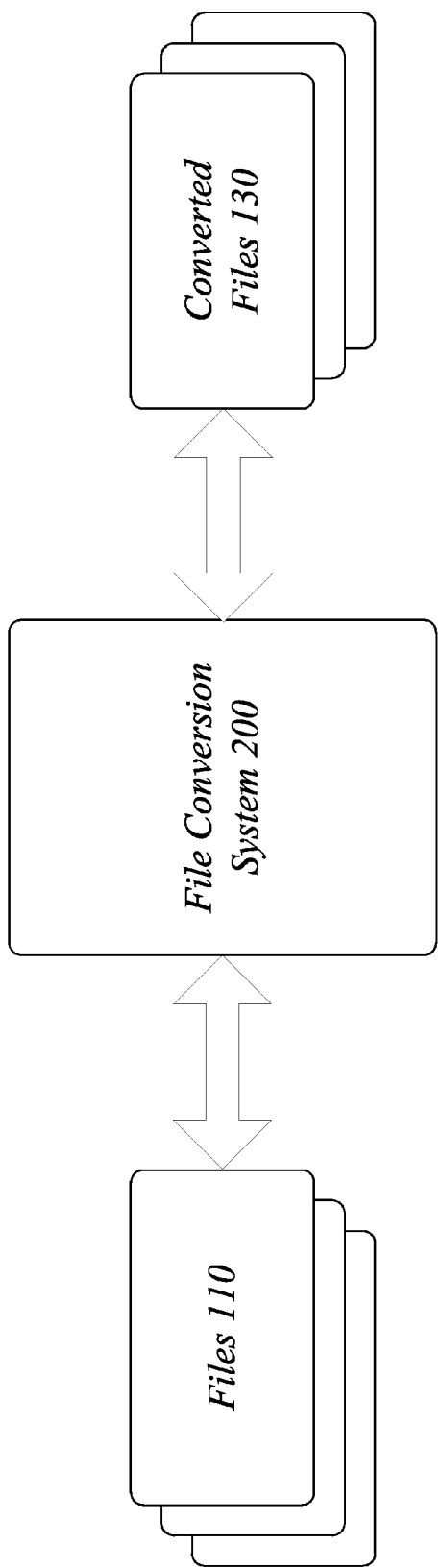
FIG. 1 illustrates an embodiment of a first file conversion system.

Embodiments are directed to a file conversion system, service or application arranged to implement enhanced file conversion techniques arranged to handle different types of file conversions based on a given set of conversion parameters. File conversion systems are typically designed for different use scenarios, ranging from batch processing of a large number of files to a single file. Examples of file conversion parameters may include without limitation a number of files, conversion time or latency, resource allocation, file priorities, security, file type, request type, and so forth.

In one embodiment, a file conversion system may be arranged to perform both high throughput and low latency file conversions from one file format into another file format using a same set of server resources. Further, the file conversion service is able to accommodate multiple file conversion requests, including both high throughput and low latency requests, from multiple clients using the same set of server resources.

In various embodiments, a file conversion system may be arranged to allocate file conversion resources based on file conversion request type. Further, the file conversion system may be arranged to allocate file conversion resources across multiple clients, sometimes referred to as "tenants." In addition, the file conversion system may be arranged to ensure protection and privacy of tenant resources with a system that accommodates multiple tenants. Finally, the file conversion system may be arranged to handle file conversion requests based on priority levels assigned to the requests.

Embodiments have several advantages over conventional file conversion techniques. For example, conventional file conversion services typically need underlying knowledge of an object model used by a particular product or platform implementing the file conversion technique. This is because most file conversion services are tightly integrated with an underlying product or platform. This requirement means that a developer is restricted to always work within the context of the underlying platform when taking advantage of a given service. The only way to deal with files outside of a given product or platform is to first get the files integrated with the product or platform, which adds extra complexity and performance considerations. Another issue with the current model of working with physical files is that there are several service scenarios where the output of the service is not the final output of the solution. In these particular cases a developer is forced to manually clean intermediate files created by the service. This implies a performance hit with current designs because a content database is being accessed more than necessary. What makes matters worse for asynchronous services is that there is no event or indication as to when a service operation has been completed. This limitation makes creating events or triggers very difficult. Another issue is that file conversion services are typically designed for a specific type of service, either asynchronous service or synchronous service. Asynchronous services depend on a timer to initiate file conversion, making it difficult or impossible to handle synchronous file service requests needing immediate handling. Rather, synchronous requests must wait for the timer to indicate when service operations are triggered. In some asynchronous systems, wait time may be anywhere from minutes to hours. While the timer job-based design and behavior works well for bulk operation scenarios, this design fails for operation scenarios involving smaller number of documents. The embodiments details enhanced file conversion techniques to address these and other issues in order to make file conversion services more robust and usable in more end-to-end scenarios.

The enhanced file conversion techniques may be suitable for many use scenarios. For instance, assume a printer company is looking to add a new service that will enable "cloud printing" of documents. This service will enable printers to have their own email address. Users will then be able to email printers documents, via attachments, that will then be printed. The print operation needs to be as quick as a manual print operation from an application. The printer company, however, may not want to automate an application client for the documents on their servers to perform the print operation due to the unsupported nature of unattended automation features. Instead, the printer company may implement the enhanced file conversion techniques to perform a quick file conversion operation on the server from a source file format to a target file format, which can then be used to complete the print operation. In another example, assume a digital publishing company desires to add a new service that will allow users to read certain documents on a proprietary digital "e-book" reader device. This service will allow users to email documents, via attachments, to the e-book service, which is then able to convert the documents to a format supported by the digital e-book reader device. The e-book service needs to be as quick as possible so that users are not waiting to read their requested documents. The digital publishing company can implement the enhanced file conversion techniques to create an appropriate e-book format. In still another example, assume a company desires to translate documents between different languages. The translation service will be able to translate entire libraries or one-off documents. For the one-off document case, the translation service needs to be on demand (e.g., completed immediately). The enhanced file conversion techniques can perform any necessary file format conversions to facilitate language translations. These are merely a few exemplary use scenarios, and others exist as well.

FIG. 1 illustrates a block diagram for a file conversion system 100. In one embodiment, for example, the file conversion system 100 may comprise a computer-implemented file conversion system 100 having multiple components. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the file conversion system 100 may be implemented as part of one or more electronic devices in a centralized or distributed architecture. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a gaming device, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the file conversion system 100 as shown in FIG. 1 has a limited number of elements in a certain topology, it may be appreciated that the file conversion system 100 may include more or less elements in alternate topologies as desired for a given implementation.

In various embodiments, the file conversion system 100 may be executed on any computing device or platform, such as a server. Throughout this specification, the term "platform" may be a combination of software and hardware components for managing mapping operations in conjunction with client devices, such as a personal computer or mobile device. Examples of platforms include, but are not limited to, a hosted service or "cloud computing service" executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. Additionally or alternatively, the file conversion system 100 may be executed on mobile devices such as smart phones, handheld computers, wireless Personal Digital Assistants (PDAs), mapping application enabled cellular phones, vehicle mount computing devices and other electronic devices providing a suitable environment for the file conversion system 100 as previously described. The embodiments are not limited in this context.

In the illustrated embodiment shown in FIG. 1, the file conversion system 100 may comprise a file conversion system 200 accepting as input one or more files 110, and providing as output one or more corresponding converted files 130. In other words, each file 110 typically has a corresponding converted file 130. The files 110 may be computer files generated and/or stored in accordance with a first data format or data schema. The converted files 130 may be computer files generated and/or stored in accordance with a second data format or data schema. In one embodiment, for example, the files 110, 130 share a same or similar content and the first and second data formats are different from each other. In one embodiment, for example, the files 110, 130 share a same or similar data formats and different media content (e.g., language translation). In one embodiment, for example, the files 110, 130 have different content and different data formats. The embodiments are not limited in this context.

The file conversion system 100 performs file conversion in response to at least two types of file conversion requests: (1) asynchronous requests; and (2) synchronous requests. The file conversion system 100 is capable of handling both types of requests using a shared set of file conversion resources. File conversion resources may include one or more devices, device components (e.g., processors, memory units, interfaces, etc.), networks, network components, and so forth.

Asynchronous file conversion requests are requests for file conversion at a defined time interval. In other words, file conversion operations for asynchronous requests are delayed to some future time period. Asynchronous requests are well-suited for higher throughput file conversion operations that are initiated at defined time intervals. Asynchronous requests are typically designed to convert many files at a time.

Synchronous file conversion requests are requests for immediate file conversion. In other words, file conversion operations for synchronous requests are initiated immediately upon receipt of the request. Synchronous requests are well-suited for lower latency file conversion operations that are typically initiated immediately upon receipt of a request. These requests may also have a higher priority and take precedence over existing requests.

In addition, the file conversion system 100 takes into account the possibility of having more than one file conversion request at a time. For example, in cases where there are multiple file conversion requests of a same type (e.g., asynchronous or synchronous), the file conversion system 100 may process the requests in an order in which the requests were made, such as a first-in-first-out (FIFO) basis. For cases where there are multiple file conversion requests of different types (e.g., asynchronous or synchronous), the file conversion system 100 may ensure that synchronous requests take precedence over asynchronous requests in accordance with a desired prioritization algorithm.

Further, the file conversion system 100 takes into account the possibility of having more than one file conversion request for a single tenant, and handles multiple file conversion requests for a single tenant in a manner that ensures the tenant does not monopolize system resources relative to other tenants. This may be accomplished, for example, using various load balancing techniques.

Figure 2A:
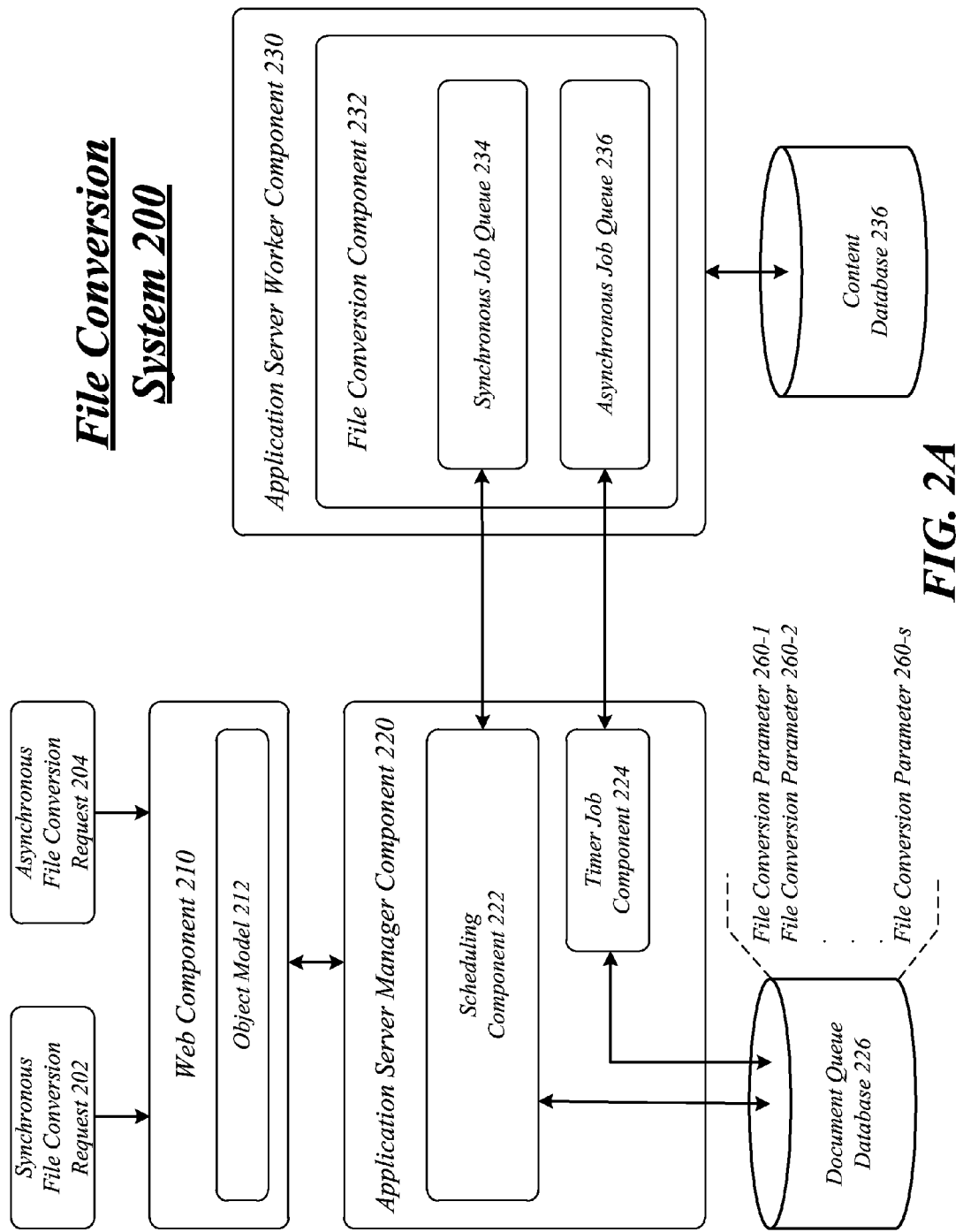
FIG. 2A illustrates an embodiment of a second file conversion system.
Figure 2B:
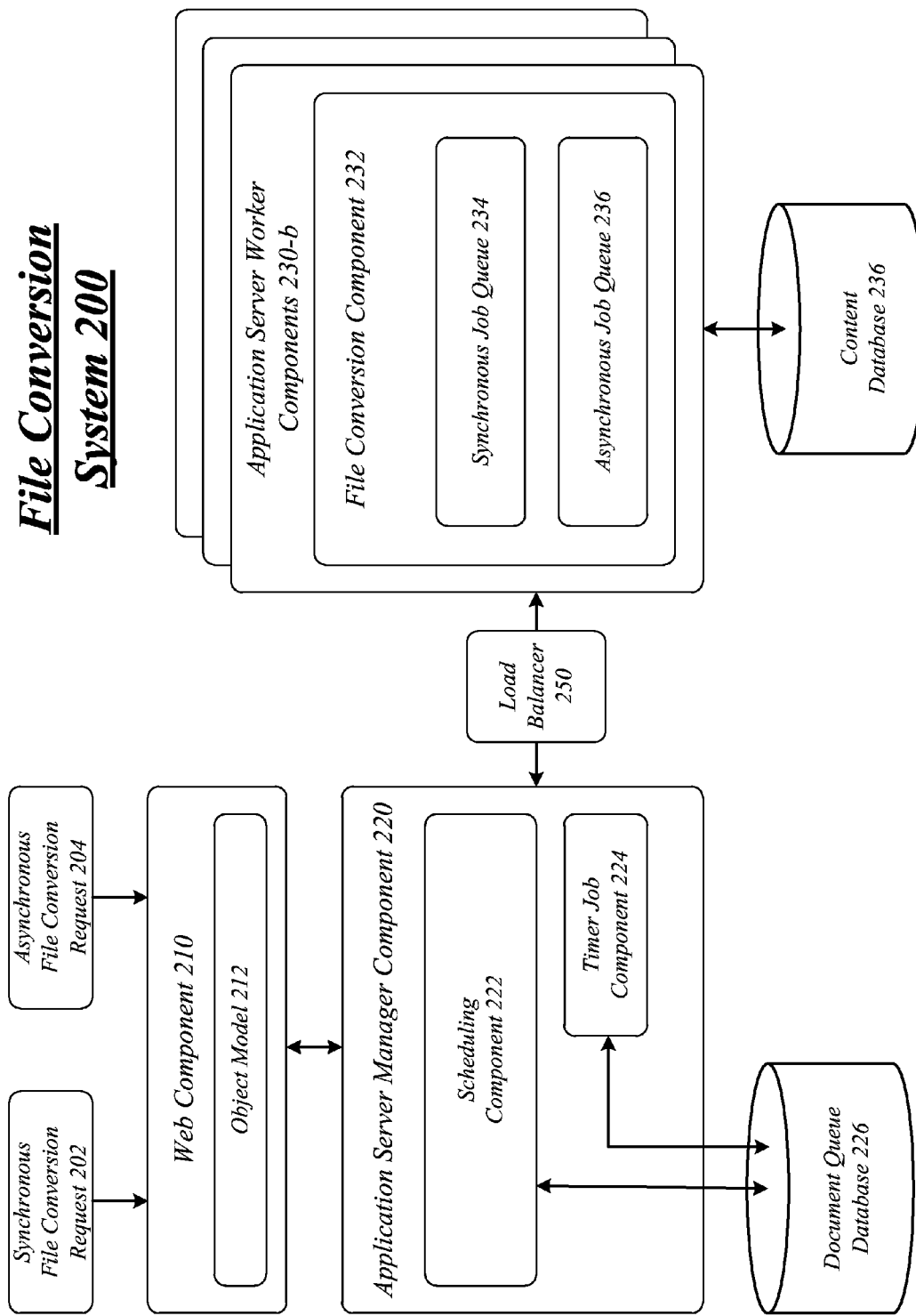
FIG. 2B illustrates an embodiment of a second file conversion system with a load balancer.

FIGS. 2A, 2B illustrate block diagrams for a file conversion system 200. The file conversion system 200 may comprise a more detailed version of the file conversion system 100, including multiple components and various databases. The components and databases may be communicatively coupled via various types of communications media. Further, the various components may coordinate operations between each other. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In the illustrated embodiment shown in FIGS. 2A, 2B, a web component 210 includes an object model 212. The web component 210 is communicatively coupled to an application server manager component 220. The application server manager component 220 comprises a scheduling component 222 and a timer job component 224. The application server manager component 220 is communicatively coupled to a document queue database 226. The application server manager component 220 is also communicatively coupled to an application server worker component 230. The application server worker component 230 comprises a file conversion component 232 to manage multiple job queues, including a synchronous job queue 234 and an asynchronous job queue 236. The application server worker component 230 is communicatively coupled to a content database 236. It may be appreciated that the file conversion system 200 may have alternate In one embodiment, the application server manager component 220 may be arranged to receive different types of file conversion requests to convert files 110 between different file formats, send synchronous file conversion requests 202 to the synchronous job queue 234 when the synchronous file conversion requests 202 are received, and send asynchronous file conversion requests 204 to the asynchronous job queue 236 at defined time intervals. One or more application server worker components 230 may manage the queues 234, 236, and perform the actual file conversion operations under control of the application server manager component 220.

As shown in FIG. 2A, the web component 210 may include an object model 212. The object model 212 enables developers to create asynchronous file conversion requests and to monitor file conversions in progress. The web component 220 may be arranged to receive the file conversion requests 202, 204 from a client system via the object model 212.

The web component 210 may be communicatively coupled to an application server manager component 220. The application server manager component 220 may perform back end server operations for synchronous file conversion requests 202 and asynchronous file conversion requests 204. Both types of requests 202, 204 may be scheduled for file conversion operations in a manner consistent with each type of request.

The application server manager component 220 may receive different types of file conversion requests 202, 204 to convert files 110 between different file formats to form corresponding converted files 130 from the web component 210. An input file 110 may have a source file format while a converted file 130 may have a target file format. The source and target file formats may be any known file formats suitable for a given application, service or machine. Further, the source and target file formats may be for software made by a same company or different companies. In one embodiment, the source and target file formats may differ in data schemas or logical data storage structures while maintaining the same or similar file content. In one embodiment, the source and target file formats may differ in file content while maintaining the same or similar data schema. In one embodiment, the source and target file formats may differ in both file content and data schemas. The embodiments are not limited in this context.

By way of example and not limitation, the files 110, 130 may have a source file format and a target file format of a content file for a productivity suite of inter-related client applications, server applications and web services, designed for a particular operating system, such as a MICROSOFT® OFFICE productivity suite for MICROSOFT WINDOWS®, made by Microsoft Corporation, Redmond, Wash. Examples for client applications may include without limitation MICROSOFT WORD, MICROSOFT EXCEL®, MICROSOFT POWERPOINT®, MICROSOFT OUTLOOK®, MICROSOFT ACCESS®, MICROSOFT INFOPATH®, MICROSOFT ONENOTE®, MICROSOFT PROJECT, MICROSOFT PUBLISHER, MICROSOFT SHAREPOINT® WORKSPACE, MICROSOFT VISIO®, MICROSOFT OFFICE INTERCONNECT, MICROSOFT OFFICE PICTURE MANAGER, MICROSOFT SHAREPOINT DESIGNER, MICROSOFT LYNC, and others. It may be appreciated that the source file format and the target file format may be for different unrelated software applications as well.

As an example of different data schemas, assume a printer company is looking to add a new service that will enable "cloud printing" of documents. This service will enable printers to have their own email address. Users will then be able to email documents for printing operations, via attachments, that will then be printed. The print operation needs to be as quick as a manual print operation from an application. The printer company, however, may not want to automate an application client for the documents on their servers to perform the print operation due to the unsupported nature of unattended automation features. Instead, the printer company may implement the enhanced file conversion techniques to perform a quick file conversion operation on the server from a source file format to a target file format, which can then be used to complete the print operation. In this case, an example for a source file format might be a ".xls" file format generated by MICROSOFT EXCEL, while an example of a target file format might be a portable document format (PDF).

In another example of different data schemas, assume a digital publishing company desires to add a new service that will allow users to read certain documents on a proprietary digital "e-book" reader device. This service will allow users to email documents, via attachments, to the e-book service, which is then able to convert the documents to a format supported by the digital e-book reader device. The e-book service needs to be as quick as possible so that users are not waiting to read their requested documents. The digital publishing company can implement the enhanced file conversion techniques to create an appropriate e-book format. In this use scenario, an example of a source file format might be a ".doc" file format generated by MICROSOFT WORD, while an example of a target file format might be multipurpose internet mail extensions (MIME) hypertext markup language (HTML) (collectively "MIME HTML" or "MHT").

As an example of different file content, assume a company desires to translate documents between different languages. The translation service will be able to translate entire libraries or one-off documents. For the one-off document case, the translation service needs to be on demand (e.g., completed immediately). The enhanced file conversion techniques can perform any necessary file format conversions to facilitate language translations. In this case, an input file 110 may have a file format in a first human language (e.g., English), while a converted file 130 may have a file format in a second human language (e.g., Chinese).

As an example of different file contents and file formats, assume a file 110 comprises a MICROSOFT WORD document is sent to a cloud facsimile service in a first human language. The cloud facsimile service may convert the first human language (e.g., English) to a second human language (e.g., Korean), and the ".doc" application file format to a PDF file format, and then fax the converted filed 130 for the file 110 as a PDF in the second human language.

The application server manager component 220 may include a scheduling component 222. The scheduling component 222 is responsible for moving incoming requests into a document queue database 226, and sending certain types of requests to a file conversion component 232 for processing. The document queue database 226 stores a persistent queue of requested, current, and completed conversions. Storing the queue of conversions on a central database server gives the queue improved scalability, reliability, and availability for tracking large sets of conversions for longer periods of time.

In one embodiment, the scheduling component 222 may determine whether a file conversion request is a synchronous file conversion request 202 or an asynchronous file conversion request 204 based on one or more file conversion parameters 260-a associated with the file conversion request. It is worthy to note that "a" and "b" and "c" and similar designators as used herein are intended to be variables representing any positive integer. Thus, for example, if an implementation sets a value for a=5, then a complete set of file conversion parameters 260-a may include file conversion parameters 260-1, 260-2, 260-3, 260-4 and 260-5. The embodiments are not limited in this context.

File conversion systems 100, 200 are typically designed for different use scenarios, ranging from batch processing of a large number of files to a single file. The file conversion parameters 260-a may be used to define certain attributes or properties for a given file conversion request 202, 204. Examples of file conversion parameters 260-a may include without limitation a number of files, conversion time or latency, resource allocation, file priorities, security, file type, request type, and so forth. For instance, a file conversion parameter 260-1 may comprise a number value representing a number of files 110 to convert to converted files 130. A file conversion parameter 260-2 may comprise a latency value representing an amount of time to convert a number of files 110 to converted files 130. A file conversion parameter 260-3 may comprise a resource value representing a number of resources (e.g., application server worker components 130, memory units, processors, bandwidth, etc.) needed to convert a number of files 110 to converted files 130. A file conversion parameter 260-4 may comprise a priority value representing a priority level for one or more files 110. A file conversion parameter 260-5 may comprise a security value representing a cryptographic technique or security credentials associated with one or more files 110. A file conversion parameter 260-6 may comprise a file type value representing a file format or content format for one or more files 110 and/or converted files 130. A file conversion parameter 260-7 may comprise a request value representing an explicit setting for a synchronous file conversion request 202 or asynchronous file conversion request 204. These are merely a few examples, and other file conversion parameters 260-a may be defined for a given implementation. The embodiments are not limited in this context.

The scheduling component 222 may determine a request type for a file conversion request received via the web component 210. For instance, the scheduling component 22 may determine whether a received file conversion request is a synchronous file conversion request 202 or an asynchronous file conversion request 204 based on a set of file conversion parameters 260-a associated with the received file conversion request.

In one embodiment, for example, the scheduling component 222 may determine a file conversion request is a synchronous file conversion request 202 when a first file conversion parameter 260-1 indicates a number of files to be one and a second file conversion parameter 260-2 indicates a latency value that is less than a threshold value. For instance, assume a number value is set to 1, a latency value is set for 5 minutes, and a threshold value is a default value set at 10 minutes. In this case, the scheduling component 222 may determine that an incoming file conversion request is a synchronous file conversion request 202 for a single document that requires lower latency for file conversion operations.

In one embodiment, for example, the scheduling component 222 may determine a file conversion request is an asynchronous file conversion request 204 when a first file conversion parameter 260-1 indicates a number of files to be greater than one and a second file conversion parameter 260-2 indicates a latency value that is greater than a threshold value. For instance, assume a number value is set to 5, a latency value is set for 1 day, and a threshold value is a default value set at 10 minutes. In this case, the scheduling component 222 may determine that an incoming file conversion request is an asynchronous file conversion request 204 for multiple documents tolerant of higher latency for file conversion operations.

Additionally or alternatively, the scheduling component 222 may determine whether a request type for a file conversion request by examining an explicit file conversion parameter 260-a. For instance, the scheduling component 222 may retrieve a file conversion parameter 260-7 associated with a received file conversion request. The file conversion parameter 206-7 may comprise a request value representing an explicit setting for a synchronous file conversion request 202, asynchronous file conversion request 204, or some other request type. The file conversion parameter 206-7 may be received with the file conversion request, such as embedded in a header or payload portion of a data packet used to transport the file conversion request. Alternatively, the file conversion parameter 206-7 may be stored a priori in the document queue database 226. The file conversion parameter 206-7 may be set by the user, or assigned by the file conversion system 200 (e.g., based on past history). The embodiments are not limited in this context.

Once a request type has been determined for a file conversion request, the scheduling component 222 may send synchronous file conversion requests 202 to the synchronous job queue 234 when the synchronous file conversion requests 202 are received. For instance, the scheduling component 222 may determine a received file conversion request is a synchronous file conversion request 202, and send the synchronous file conversion request 202 directly to the synchronous job queue 234 immediately after the determination is made for immediate processing by the application server worker component 230. This helps ensure the synchronous file conversion request 202 is processed with lower latency. Although a copy of the synchronous file conversion request 202 may be stored in the document queue database 226, this copy is for tracking purposes and not for scheduling job requests for future processing.

By way of contrast, the scheduling component 222 may send asynchronous file conversion requests 204 to the asynchronous job queue 236 at defined time intervals. For instance, the scheduling component 222 may determine a received file conversion request is an asynchronous file conversion request 204, and store the asynchronous file conversion request 204 in the document queue database 226 for future processing by the application server worker component 230. This is typically because the synchronous file conversion request 204 is for a larger number of files that can tolerate a higher degree of latency, such as for "batch processing" operations performed during time periods of low resource utilization (e.g., evening hours for a given time zone).

The application server manager component 220 may include a timer job component 224. The timer job component 224 may include a timer and associated logic to control a frequency of conversions and the number of files that are actively being converted. The timer job component 224 may be arranged to periodically retrieve asynchronous file conversion requests 204 from the document queue database 226 at defined time intervals, and send the asynchronous file conversion requests 204 to the asynchronous job queue 236.

The application server manager component 220 may be communicatively coupled to an application server worker component 220. Although the components 220, 230 may be shown as separate components, it may be appreciated that components 220, 230 may be implemented on a same server or different servers as desired for a given implementation. The embodiments are not limited in this context.

The application server worker component 220 may perform actual file conversion operations for the file conversion system 200, and is communicatively coupled to a content database 236 to assist in file conversion operations. In one embodiment, for example, the file conversion system 200 may further comprise an application server worker component 230 arranged to receive synchronous file conversion requests 202 and asynchronous file conversion requests 204, and store the received synchronous file conversion requests 202 and the received asynchronous file conversion requests 204 in the synchronous job queue 234 and the asynchronous job queue 236, respectively.

The application server worker component 220 may include the file conversion component 232. The file conversion component 232 performs the actual file conversion service operations. The file conversion component 232 maintains one or more internal queues containing items that need to be converted. As shown, the file conversion component 232 contains a synchronous job queue 234 and an asynchronous job queue 236. In one embodiment, for example, the application server worker component 230 may comprise a file conversion component 232 arranged to process any synchronous file conversion requests 202 stored in the synchronous job queue 234 until the synchronous file queue 234 is empty before processing any asynchronous file conversion requests 204 stored in the asynchronous job queue 236.

In general operation, the scheduling component 222 may receive a synchronous file conversion request 202 through the web component 210 via the object model 212. Since a synchronous file conversion request 202 prioritizes lower latency over higher volume, the scheduling component 222 immediately stores the synchronous file conversion request 202 in the synchronous job queue 234 for immediate processing. The synchronous job queue 234 is arranged to only store synchronous file conversion requests 202. In one embodiment, only the scheduling component 222 is capable of adding synchronous file conversion requests 202 to the synchronous job queue 234. The file conversion component 232 is arranged to process requests from the synchronous job queue 234 over requests stored in the asynchronous job queue 236.

The scheduling component 222 of the application server manager component 220 keeps track of synchronous file conversion requests 202 in volatile or non-volatile memory. The scheduling component 222 checks to see if a current synchronous file conversion request 202 exceeds the N+1 limit set for such requests, where N is any positive integer. If so, then a status for the current synchronous file conversion requests 202 is set to "Cancelled" and the web component 210 is told to retry at a later time. If not, then the scheduling component 222 continues to process request. The scheduling component 222 sends the synchronous file conversion request 202 directly to the synchronous job queue 234 of the file conversion component 232 of the application server worker component 230. If the synchronous file conversion request 202 is a stream-based request, then the scheduling component 222 may store the input stream as a temporary file within a file system for the application server worker component 230.

The scheduling component 222 may also receive an asynchronous file conversion request 204 through the web component 210 via the object model 212. Since an asynchronous file conversion request 204 prioritizes higher volume over lower latency, the scheduling component 222 stores the asynchronous file conversion request 204 in the document queue database 226 for delayed processing. The timer job component 224 retrieves the asynchronous file conversion request 204 at a defined time interval associated with the asynchronous file conversion request 204, and sends the asynchronous file conversion request 204 to the asynchronous job queue 236 at the defined time interval.

The scheduling component 222 updates the document queue database 226 with information on the requests 202, 204. At certain defined time intervals, the timer job component 224 checks the document queue database 226 for jobs which need to be run for the asynchronous file conversion requests 204. The file conversion component 232 is arranged to process requests from the asynchronous job queue 236 behind requests stored in the synchronous job queue 234.

As shown in FIG. 2B, the timer job component 224 pushes jobs to be run into a load balancer 250 to execute. The load balancer 250 (or the timer job component 224) sends jobs to an appropriate application server worker component 230-$b$ (e.g., there may be more than one) for processing (e.g., file conversion operations). The timer job component 224 updates the document queue database 226 with a new status for the various jobs. The timer job component 224 also looks for jobs which have not completed in a maximum allowed time and checks if the application server working component 230 handling them has failed.

The application server worker component 230 receives requests 202, 204 from the application server manager component 220. Synchronous file conversion requests 202 are placed in the synchronous job queue 234. Asynchronous file conversion requests are placed in the asynchronous job queue 236. The file conversion component 232 processes requests from the synchronous job queue 234 until empty. The file conversion component 232 then processes requests from the asynchronous job queue 236. Requests from the asynchronous job queue 236 do not have to be completely processed in a single contiguous time period. For instance, processing of an asynchronous file conversion request 204 may be temporarily paused or interrupted to process a new synchronous file conversion request 202 stored in the synchronous job queue 234, and the file conversion component 232 may resume processing the interrupted asynchronous file conversion request 204 once the synchronous job queue 234 is once again empty. Error conditions, such as a failure to retrieve a file 110, are logged and appropriate status messages are sent to the application server manager component 220. Cancelled requests are discarded.

If a synchronous file conversion request 202 is stream based, then the application server worker component 230 may read an input file from a temporary file on its file system. The application server worker component 230 will then write out a resulting file as a temporary file in its own file system. The application server worker component 230 will have access to the file system in order to deal with temporary files that represent input and output files for stream-based requests.

Once the file conversion component 232 completes file conversion operations for a request 202, 204 (regardless of success/failure), a request complete application program interface (API) is initiated. If successful, the file conversion component 232 attempts to save the converted file 130 to a specified output location or stream, and sets a file conversion status based on success or failure. If a request 202, 204 is non-stream-based, then the application server worker component 230 places the result into the content database 236. If a request 202, 204 is stream-based, then the application server manager component 220 may read a resulting temporary file stored on a file system of the application server worker component 230 as a stream. The web component 210 is able to retrieve the resulting stream from the application server manager component 220. On completing stream-based requests, all associated temporary files are removed from the file system during garbage collection operations (e.g., tearing down a file conversion session, releasing resources, deleting temporary files, and so forth).

The application server manager component 220 may keep track of a number of synchronous file conversion requests 202 that are currently in progress by the file conversion system 200 in memory. The scheduling component 222 may have access to in memory tracking of in progress synchronous file conversion requests 202. The scheduling component 222 may select an appropriate application server worker component 230 to complete an approved synchronous file conversion request 202. The scheduling component 222 may add synchronous file conversion requests 202 directly to a synchronous job queue 234 within a selected application server worker component 230. For synchronous file conversion requests 202 that are stream-based, the scheduling component 222 will store an input stream as a temporary file on a file system of an appropriate application server worker component 230. The scheduling component 222 may further read resulting temporary files on the application server worker component 230 file system as streams stored in memory.

Various file conversion parameters may be set for the file conversion system 200. Examples of file conversion parameters are shown in Table 1 as follows:

TABLE 1

| Setting Label | Setting Description | Control Label | Control Type | Control Validation |
|---|---|---|---|---|
| Maximum Synchronous Conversion Requests | Specify the maximum number of synchronous conversion requests that can be processed at a time on each server available to the service application. | Maximum number of synchronous conversion requests (per conversion process): | Text box | Min = 0<br>Max = 1000<br>Default = 25 |

Specifying a value of "0" for the Maximum Synchronous Conversion Requests implies that synchronous file conversion requests 202 are not allowed on the file conversion system 200. Any synchronous file conversion requests 202 made when this value is set to "0" will result in an error message to the user. It is worthy to note that minimum, maximum, and default values may be set based on testing data during stabilization and desired file conversion throughput.

Figure 3:
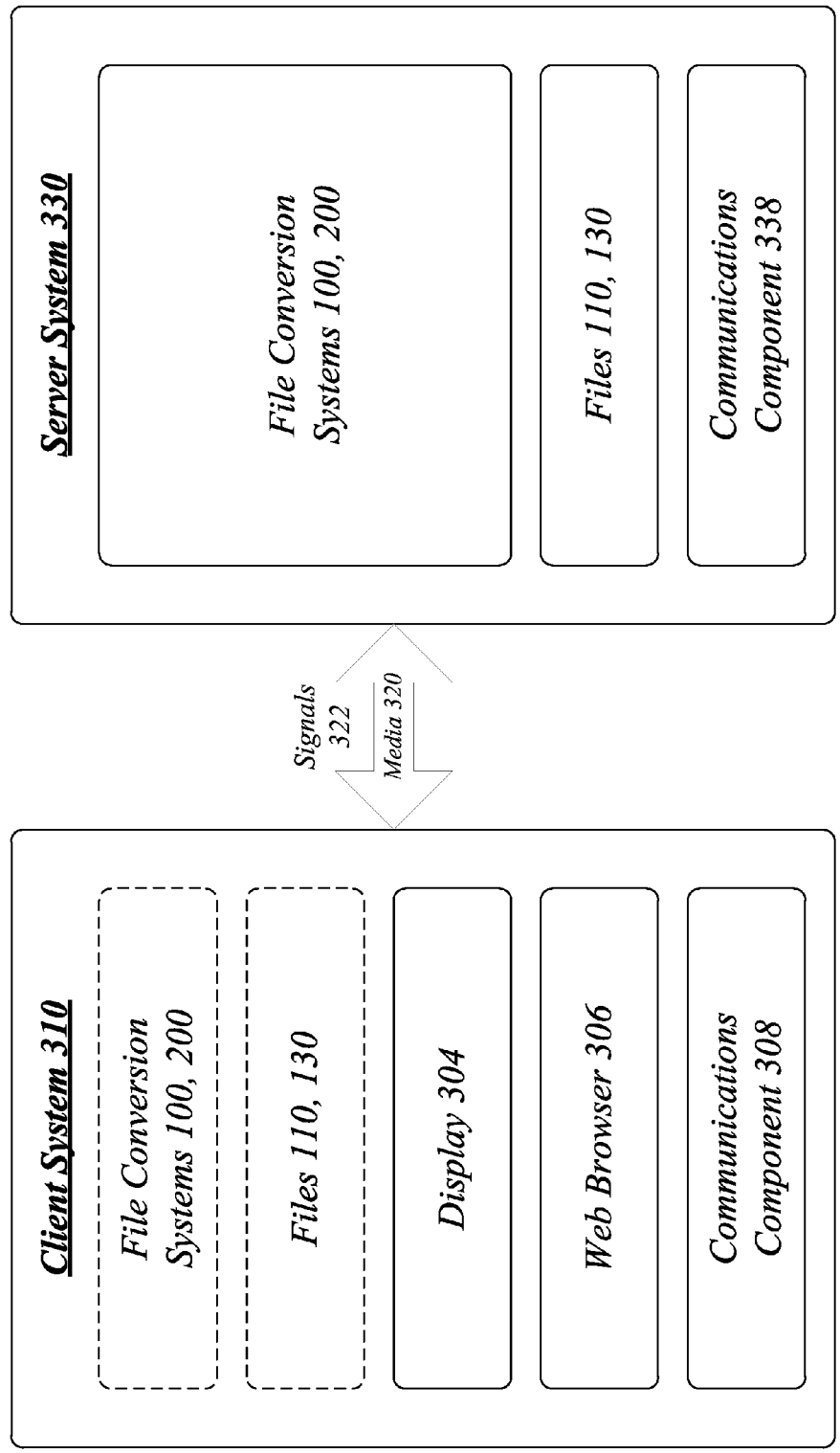
FIG. 3 illustrates an embodiment of a distributed system suitable for implementing the first and second conversion systems.

FIG. 3 illustrates a block diagram of a distributed system 300. The distributed system 300 may distribute portions of the structure and/or operations for the file conversion system 100 across multiple computing entities. Examples of distributed system 300 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, for example, the distributed system 300 may be implemented as a client-server system. A client system 310 may implement some or all of the file conversion systems 100, 200, some or all of the files 110, 130, a display 304, a web browser 306, and a communications component 308. A server system 330 may implement some or all of the file conversion systems 100, 200, some or all of the files 110, 130, and a communications component 338. Although the distributed system 300 as shown in FIG. 3 has a limited number of elements in a certain topology, it may be appreciated that the distributed system 300 may include more or less elements in alternate topologies as desired for a given implementation.

The client system 310 may comprise or employ one or more client computing devices and/or client programs that operate to perform various client operations in accordance with the described embodiments. Examples of the client system 310 may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, gaming devices, television, digital television, set top box, wireless access point, base station, subscriber station, mobile subscriber center, radio network controller, router, hub, gateway, bridge, switch, machine, or combination thereof.

In various embodiments, the server system 330 may comprise or employ one or more server computing devices and/or server programs that operate to perform various server operations in accordance with the described embodiments. For example, when installed and/or deployed, a server program may support one or more server roles of the server computing device for providing certain services and features. Exemplary server systems 330 may include, for example, stand-alone and enterprise-class server computers operating a server operating system (OS) such as a MICROSOFT OS, a UNIX® OS, a LINUX® OS, or other suitable server-based OS. Exemplary server programs may include, for example, communications server programs such as MICROSOFT WINDOWS LIVE® or MICROSOFT OFFICE COMMUNICATIONS SERVER (OCS) for managing incoming and outgoing messages, messaging server programs such as MICROSOFT EXCHANGE SERVER for providing unified messaging (UM) for e-mail, voicemail, VoIP, instant messaging (IM), group IM, enhanced presence, and audio-video conferencing, and/or other types of programs, applications, or services in accordance with the described embodiments.

The client system 310 and the server system 330 may communicate with each over a communications media 320 using communications signals 322. In one embodiment, for example, the communications media 320 may comprise a public or private network. In one embodiment, for example, the communications signals 322 may comprise wired or wireless signals. Computing aspects of the client system 310 and the server system 330 may be described in more detail with reference to FIG. 5. Communications aspects for the distributed system 300 may be described in more detail with reference to FIG. 6.

The distributed system 300 illustrates an example where the client system 310 may access the server system 330 to perform file conversion operations for files 110. The files 110 may be stored by the client system 310 and sent to the server system 330 as communications signals 322 over the communications media 320. The server system 330 may receive the files 110 from the client system 310, perform file conversion operations via a server version of the file conversion systems 100, 200, and return converted files 130 to the client system 310. Alternatively, the client system 310 may be implemented as a centralized system, and perform file conversion operations itself via a client version of the file conversion systems 100, 200. A user may interface and control the file conversion systems 100, 200 implemented by the server system 330 via the web browser 306 of the client system 310. Examples of suitable web browsers may include MICROSOFT INTERNET EXPLORER®, GOOGLE® CHROME and APPLE® SAFARI, to name just a few. The server system 330 may send status messages (e.g., success messages, failure messages, error messages, status messages, and so forth) for presentation on the display 304 of the client system 310.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 4 illustrates one embodiment of a logic flow 400. The logic flow 400 may be representative of some or all of the operations executed by one or more embodiments described herein, such as the file conversion systems 100, 200, for example.

The logic flow 400 may receive file conversion requests to convert files between different file formats at block 402. For instance, the web component 210 may receive file conversion requests 202, 204 to convert files 110 between different file formats. The file conversion requests 202, 204 may be received from one or more clients, such as client system 310, for example.

The logic flow 400 may determine whether the file conversion requests are synchronous file conversion requests or asynchronous file conversion requests at block 404. For instance, the scheduling component 222 of the application server manager component 220 may determine whether the file conversion requests are synchronous file conversion requests 202 or asynchronous file conversion requests 202.

The logic flow 400 may store synchronous file conversion requests in a synchronous job queue at block 406. For instance, the scheduling component 222 may store synchronous file conversion requests 202 in a synchronous job queue 234 of the file conversion component 232 of the application server worker component 230.

The logic flow 400 may store asynchronous file conversion requests in an asynchronous job queue at block 408. For instance, the scheduling component 222 may store asynchronous file conversion requests 204 in an asynchronous job queue 236 of the file conversion component 232 of the application server worker component 230.

The logic flow 400 may convert files between the different file formats associated with synchronous file conversion requests stored in the synchronous job queue prior to asynchronous file conversion requests stored in the asynchronous job queue at block 410. For instance, the file conversion component 232 of the application server worker component 230 may convert files 110 between the different file formats associated with synchronous file conversion requests 202 stored in the synchronous job queue 234 prior to asynchronous file conversion requests 204 stored in the asynchronous job queue 236. In one embodiment, the file conversion component 232 may completely process all synchronous file conversion requests 202 stored in the synchronous job queue 234 until empty before starting to process asynchronous file conversion requests 204 stored in the asynchronous job queue 236. Further, the file conversion component 232 may pause or interrupt processing asynchronous file conversion requests 204 stored in the asynchronous job queue 236 when a new synchronous file conversion request 202 is stored in the synchronous job queue 234 to release file conversion resources, and begin to process the new synchronous file conversion request 202 before resuming processing of the paused asynchronous file conversion request 204 and subsequent asynchronous file conversion requests 204 remaining the asynchronous job queue 236. The file conversion component 232 then outputs converted files 130 for delivery to the client system submitting a given file conversion request 202, 204.

Figure 5:
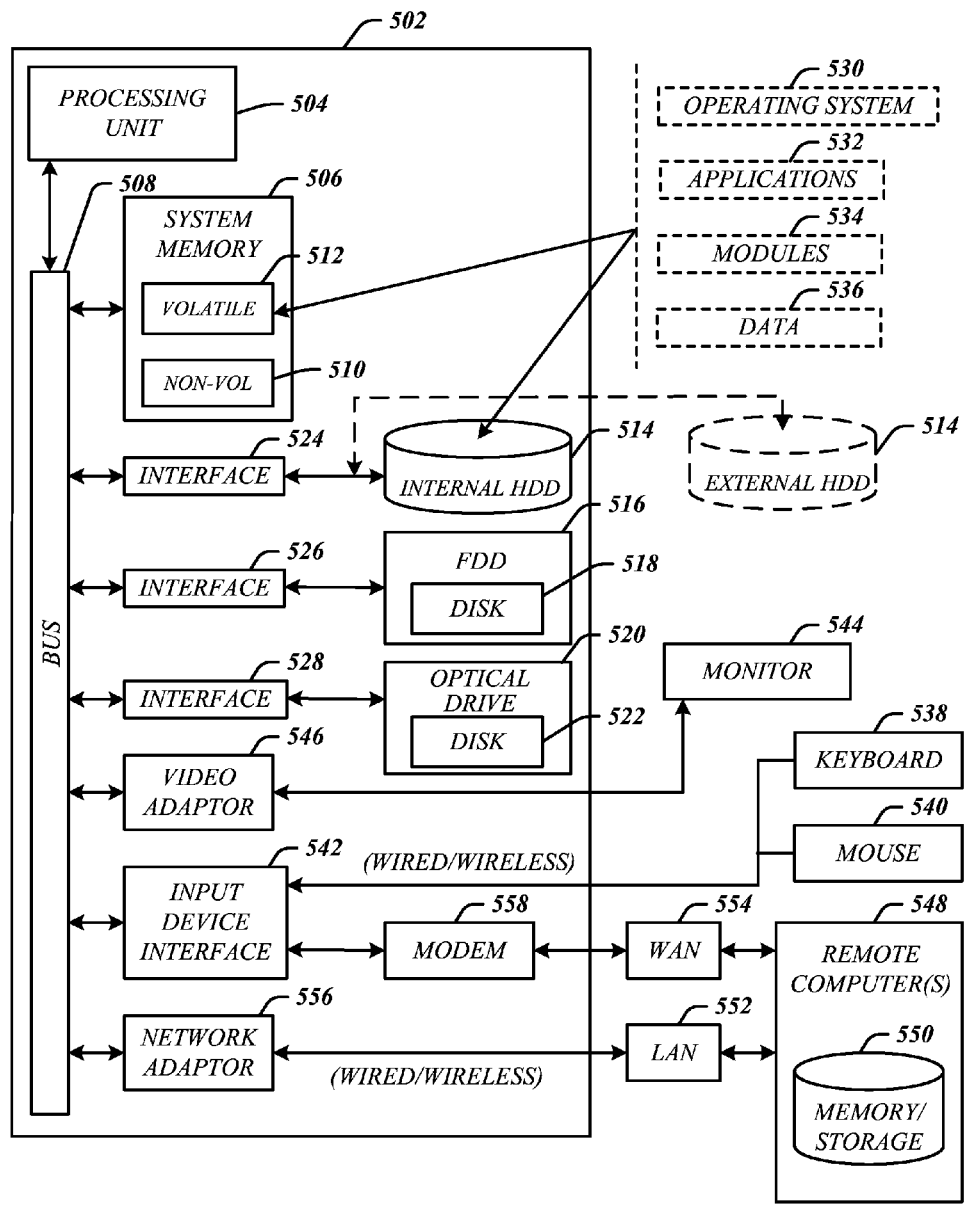
FIG. 5 illustrates an embodiment of a computing architecture.

FIG. 5 illustrates an embodiment of an exemplary computing architecture 500 suitable for implementing various embodiments as previously described. The computing architecture 500 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 500.

As shown in FIG. 5, the computing architecture 500 comprises a processing unit 504, a system memory 506 and a system bus 508. The processing unit 504 can be any of various commercially available processors. Dual microprocessors and other multi-processor architectures may also be employed as the processing unit 504. The system bus 508 provides an interface for system components including, but not limited to, the system memory 506 to the processing unit 504. The system bus 508 can be any of several types of bus structure that may further interconnect to a memory bus (with or without a memory controller), a peripheral bus, and a local bus using any of a variety of commercially available bus architectures.

The system memory 506 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 5, the system memory 506 can include non-volatile memory 510 and/or volatile memory 512. A basic input/output system (BIOS) can be stored in the non-volatile memory 510.

The computer 502 may include various types of computer-readable storage media, including an internal hard disk drive (HDD) 514, a magnetic floppy disk drive (FDD) 516 to read from or write to a removable magnetic disk 518, and an optical disk drive 520 to read from or write to a removable optical disk 522 (e.g., a CD-ROM or DVD). The HDD 514, FDD 516 and optical disk drive 520 can be connected to the system bus 508 by a HDD interface 524, an FDD interface 526 and an optical drive interface 528, respectively. The HDD interface 524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 510, 512, including an operating system 530, one or more application programs 532, other program modules 534, and program data 536. The one or more application programs 532, other program modules 534, and program data 536 can include, for example, the file conversion systems 100, 200.

A user can enter commands and information into the computer 502 through one or more wire/wireless input devices, for example, a keyboard 538 and a pointing device, such as a mouse 540. Other input devices may include a microphone, an infra-red (IR) remote control, a joystick, a game pad, a stylus pen, touch screen, or the like. These and other input devices are often connected to the processing unit 504 through an input device interface 542 that is coupled to the system bus 508, but can be connected by other interfaces such as a parallel port, IEEE 1394 serial port, a game port, a USB port, an IR interface, and so forth.

A monitor 544 or other type of display device is also connected to the system bus 508 via an interface, such as a video adaptor 546. In addition to the monitor 544, a computer typically includes other peripheral output devices, such as speakers, printers, and so forth.

The computer 502 may operate in a networked environment using logical connections via wire and/or wireless communications to one or more remote computers, such as a remote computer 548. The remote computer 548 can be a workstation, a server computer, a router, a personal computer, portable computer, microprocessor-based entertainment appliance, a peer device or other common network node, and typically includes many or all of the elements described relative to the computer 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 is connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computer 502 can include a modem 558, or is connected to a communications server on the WAN 554, or has other means for establishing communications over the WAN 554, such as by way of the Internet. The modem 558, which can be internal or external and a wire and/or wireless device, connects to the system bus 508 via the input device interface 542. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 6:
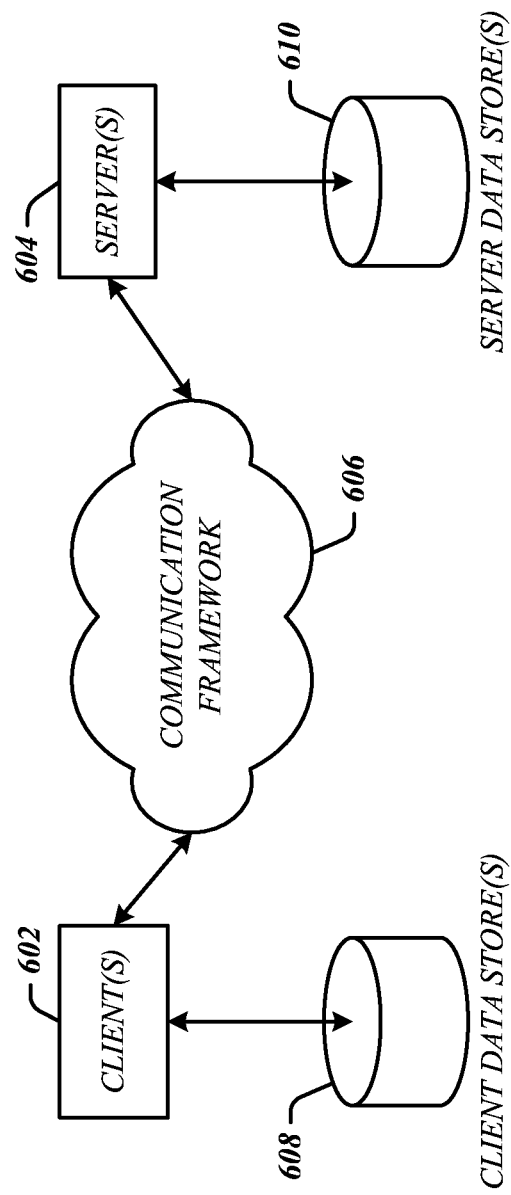
FIG. 6 illustrates an embodiment of a communications architecture.

FIG. 6 illustrates a block diagram of an exemplary communications architecture 600 suitable for implementing various embodiments as previously described. The communications architecture 600 includes various common communications elements, such as a transmitter, receiver, transceiver, radio, network interface, baseband processor, antenna, amplifiers, filters, and so forth. The embodiments, however, are not limited to implementation by the communications architecture 600.

As shown in FIG. 6, the communications architecture 600 comprises includes one or more clients 602 and servers 604. The clients 602 may implement the client systems 310, 400. The servers 604 may implement the server system 330. The clients 602 and the servers 604 are operatively connected to one or more respective client data stores 608 and server data stores 610 that can be employed to store information local to the respective clients 602 and servers 604, such as cookies and/or associated contextual information.

The clients 602 and the servers 604 may communicate information between each other using a communication framework 606. The communications framework 606 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 602 and the servers 604 may include various types of standard communication elements designed to be interoperable with the communications framework 606, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 602 and a server 604 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a computer-readable storage medium arranged to store logic. Examples of a computer-readable storage media include any storage medium capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a logic device; and
an application server manager component operative on the logic device to receive different types of file conversion requests to convert files between different file formats, send synchronous file conversion requests to a synchronous job queue when the synchronous file conversion requests are received, and send asynchronous file conversion requests to an asynchronous job queue at defined time intervals; and
a scheduling component operative on the logic device to determine whether a file conversion request is a synchronous file conversion request or an asynchronous file conversion request based on two or more file conversion parameters associated with the file conversion request, when a first file conversion parameter indicates a number of files to be one and a second file conversion parameter indicates a latency value that is less than a threshold value.

2. The apparatus of claim 1, comprising a web component operative to receive the file conversion requests from a client system via an object model.

3. The apparatus of claim 1, the scheduling component operative on the logic device to determine a file conversion request is an asynchronous file conversion request when a first file conversion parameter indicates a number of files to be greater than one and a second file conversion parameter indicates a latency value that is greater than a threshold value.

4. The apparatus of claim 1, the scheduling component operative on the logic device to determine a received file conversion request is a synchronous file conversion request, and send the synchronous file conversion request directly to the synchronous job queue immediately after the determination is made.

5. The apparatus of claim 4 wherein the application server manager component is further operative to pause processing of the asynchronous job queue immediately after the determination is made.

6. The apparatus of claim 1, the scheduling component operative on the logic device to determine a received file conversion request is an asynchronous file conversion request, and store the asynchronous file conversion request in a document queue database.

7. The apparatus of claim 1, the application server manager component comprising a timer job component operative on the logic device to retrieve asynchronous file conversion requests from a document queue database at the defined time intervals, and send the asynchronous file conversion requests to the asynchronous job queue.

8. The apparatus of claim 1, comprising an application server worker component operative to receive the synchronous file conversion requests and the asynchronous file conversion requests, and store the received synchronous file conversion requests and the received asynchronous file conversion requests in the synchronous job queue and the asynchronous job queue, respectively.

9. The apparatus of claim 1, the application server worker component comprising a file conversion component operative to process the synchronous file conversion requests stored in the synchronous job queue until the synchronous file queue is empty before processing the asynchronous file conversion requests stored in the asynchronous job queue.

10. The apparatus of claim 1 wherein the logic device receives different types of file conversion requests via email attachments.

11. A computer-implemented method, comprising:
receiving file conversion requests to convert files between different file formats;
determining whether the file conversion requests are synchronous file conversion requests or asynchronous file conversion requests based on two or more file conversion parameters associated with the file conversion request, when a first file conversion parameter indicates a number of files to be one and a second file conversion parameter indicates a latency value that is less than a threshold value;
storing synchronous file conversion requests in a synchronous job queue;
storing asynchronous file conversion requests in an asynchronous job queue at defined time intervals; and processing the synchronous file conversion requests stored in the synchronous job queue before the asynchronous file conversion requests stored in the asynchronous job queue.

12. The computer-implemented method of claim 11, comprising determining a file conversion request is a synchronous file conversion request when the file conversion request is a request for low latency conversion operations that can convert one file immediately upon receiving the file request in a synchronous manner.

13. The computer-implemented method of claim 11, comprising determining a file conversion request is an asynchronous file conversion request when the file conversion request is a request for high throughput conversion operations that can convert multiple files at a time in an asynchronous manner.

14. The computer-implemented method of claim 11, comprising:
converting files between the different file formats associated with each synchronous file conversion request stored in the synchronous job queue until the synchronous file queue is empty; and
converting files between the different file formats associated with the asynchronous file conversion requests stored in the asynchronous job queue once the synchronous file queue is empty.

15. The computer-implemented method of claim 11, comprising:
determining one or more new synchronous file conversion requests have been received by the synchronous job queue;
pausing processing of the asynchronous file conversion requests stored in the asynchronous job queue;
processing the one or more new synchronous file conversion requests from the synchronous job queue until the synchronous job queue is empty; and
resuming processing of the asynchronous file conversion requests stored in the asynchronous job queue when the synchronous job queue is empty.

16. An article of manufacture comprising a storage medium containing instructions that when executed cause a system to:
determine whether file conversion requests are synchronous file conversion requests or asynchronous file conversion requests based upon two or more file conversion parameters associated with the file conversion request, when a first file conversion parameter indicates a number of files to be one and a second file conversion parameter indicates a latency value that is less than a threshold value;
send synchronous file conversion requests to a synchronous job queue;
store asynchronous file conversion requests in a document queue database;
send asynchronous file conversion requests from the document queue database to an asynchronous job queue at defined time intervals; and
process synchronous file conversion requests stored in the synchronous job queue prior to asynchronous file conversion requests stored in the asynchronous job queue.

17. The article of manufacture of claim 16, wherein the file conversion parameters further include a conversion time, a resource allocation, a file priority, a security level, a file type, or a request type.

18. The article of manufacture of claim 16, further comprising instructions that when executed cause the system to pause processing of asynchronous file conversion requests stored in the asynchronous job queue when the synchronous job queue is not empty.

19. The article of manufacture of claim 16, further comprising instructions that when executed cause the system to resume processing of asynchronous file conversion requests stored in the asynchronous job queue when the synchronous job queue is empty.

20. The article of manufacture of claim 16, further comprising instructions that when executed cause the system to:
convert files between different file formats associated with each synchronous file conversion request stored in the synchronous job queue until the synchronous file queue is empty; and
convert files between the different file formats associated with the asynchronous file conversion requests stored in the asynchronous job queue when the synchronous file queue is empty.

* * * * *